Figure 1:
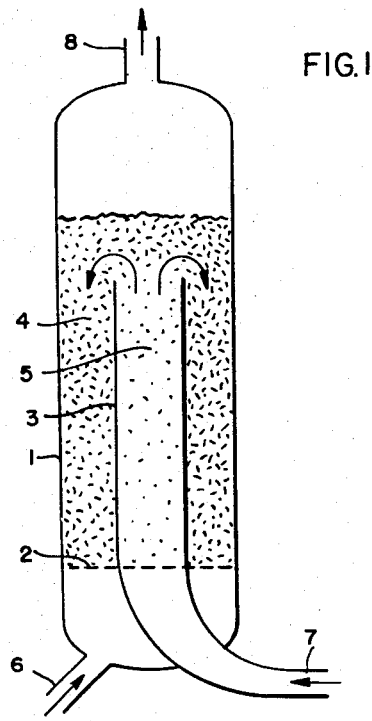

March 19, 1963 H. KROEPER ETAL 3,082,165
PROCESS AND APPARATUS FOR THE CATALYTIC
CRACKING OF HYDROCARBONS
Filed Feb. 16, 1959 3 Sheets-Sheet 1

INVENTORS:
HUGO KROEPER
ROLF PLATZ

BY *Margaret Johnston*
*Cook & Root*
ATT'YS

United States Patent Office 3,082,165
Patented Mar. 19, 1963

3,082,165
PROCESS AND APPARATUS FOR THE CATALYTIC CRACKING OF HYDROCARBONS
Hugo Kroeper, Heidelberg, and Rolf Platz, Mannheim, Germany, assignors to Badische Anilin- & Soda-Fabrik Aktiengesellschaft, Ludwigshafen (Rhine), Germany
Filed Feb. 16, 1959, Ser. No. 793,325
Claims priority, application Germany Feb. 15, 1958
20 Claims. (Cl. 208—120)

This invention relates to a process and apparatus for the production of hydrocarbons by catalytic cracking and especially to a continuous cracking process in which a fluidized layer catalyst is continuously regenerated.

Reactions with hydrocarbons which proceed purely thermally or catalytically are almost always attended by carbon deposits, sometimes very considerable, which make necessary a continuous or periodic regeneration of the heat carrier or catalyst.

It is already known to carry out this regeneration by simultaneous supply of steam and the reaction mixture to be reacted provided the chemistry of the reaction or the properties of the catalyst permit such a method of operation. In order that the watergas reaction with the consumption of the carbon should proceed with sufficient speed, however, relatively high temperatures are necessary. Moreover the watergas reaction extracts heat from the system.

According to another known proposal, a discontinuous operation is used, for example as in cracking or especially in the dehydrogenation of butane according to Houdry, by removing the carbon deposited on the catalyst after a certain reaction period by burning it off in a current of air or oxygen after the reaction chamber has previously been rinsed through with an inert gas. The combustion heat thereby occurring is accumulated in the catalyst or in heat carriers mixed with the catalyst. The accumulated heat superheats the catalyst above the temperature necessary for carrying out the process and thereby serves to cover the heat requirement of the endothermic process. Operation in this way, however, makes a very accurate temperature regulation necessary because the catalyst may only be superheated to a certain extent. Since the reaction periods until interruption for regeneration of the catalyst amount to only a few minutes, complicated reversing mechanism is necessary for carrying out the reaction and the regeneration and the intermediate rinsing of the reaction chamber.

Another method which is already known is that of continuously withdrawing from the reaction chamber the catalyst or heat carrier laden with carbon, regenerating it outside the reaction chamber and then returning it to the reaction chamber. This method which has been applied for example in catalytic cracking processes for the recovery of fuels has the disadvantage that it requires complicated apparatus and supervision means especially when this method is to be used in processes which proceed under reduced pressure.

Finally it has also already been proposed to lead the hydrocarbon to be reacted, together with oxygen, through a fluidized layer of catalyst particles or heat carriers. In this process also it is necessary to regenerate the catalyst at short intervals of time because the oxygen preferentially burns the hydrocarbon and not the carbon separated on the catalyst or heat carrier. This disadvantage is therefore also accompanied by a diminution in the yield.

We have now found that the said disadvantages in processes of cracking hydrocarbons which take place with the fracture of C—H or C—C linkages can be avoided by carrying out the cracking in a fluidized layer of catalyst into which the hydrocarbon to be cracked, if desired together with one or more carrier gases, is led from below, and another layer of fluidized catalyst, into which oxygen-containing gas is led from below for the purpose of regeneration, is so arranged that the layer serving for the regeneration is in communication only at its upper end with the layer serving for cracking and, when these layers are arranged side by side, ends at such a distance below the level of the layer for the cracking that a sufficient exchange takes place between the regenerated catalyst particles leaving the regeneration layer at the top and the catalyst particles in the layer serving for cracking, and so that the oxygen content and speed of the gas or gases introduced into the regeneration layer are so regulated that when the gas leaves this layer the oxygen is practically used up.

By working in this way, the heat set free in the regeneration of the catalyst can be made directly utilizable for the cracking which proceeds endothermically.

The two fluidized layers may be arranged in a single reaction vessel for example by arranging the layer serving for the regeneration of the catalyst concentrically within the annular layer surrounding the same and serving for the cracking of the hydrocarbons. Such an arrangement ensures a uniform loss of heat from the catalyst particle leaving the regeneration layer to the layer serving for the cracking.

FIGURE 1 of the accompanying drawings shows such an arrangement diagrammatically. A reaction vessel 1 is provided with a grate or perforated base plate 2 above which are situated fluidized layers 4 and 5 separated by a concentric tube 3. The hydrocarbons to be cracked are supplied to the fluidized layer 4 through a pipe 6 and oxygen-containing gas is supplied to the fluidized layer 5 through a pipe 7. The gaseous reaction mixture is led away through a pipe 8.

Figure 2A:
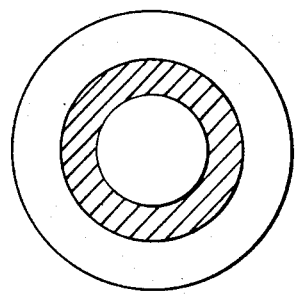
Figure 2B:
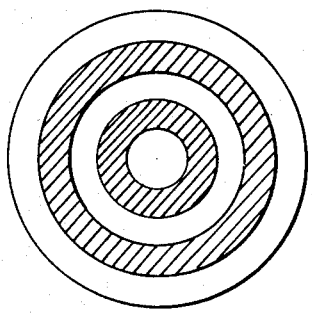
Figure 2C:
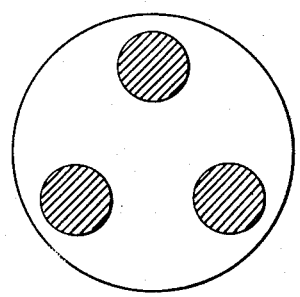

The height of the fluidized layer serving for cracking for a given base area is determined by the upper limit of the permissible carbon loading of the catalyst. The less the tolerable loading of the catalyst with carbon deposits in the cracking in any given case, the higher must be the layer serving for regeneration of the catalyst. This relationship may however also be taken care of by appropriate dimensioning of the base areas of the two fluidized layers.

Where the base area of the reaction vessel is large the layer serving for the regeneration of the catalyst may also be arranged in one or more concentric annular chambers, as shown in FIGURES 2a and 2b of the accompanying drawings which are sectional plans and in which these annular chambers are represented by hatching whereas the areas which are not hatched constitute the space serving for the cracking. The layer serving for regeneration may also be contained in a plurality of cylindrical chambers distributed over the cross-section, as indicated in FIGURE 2c of the accompanying drawings in which three such chambers are shown.

Figure 3:
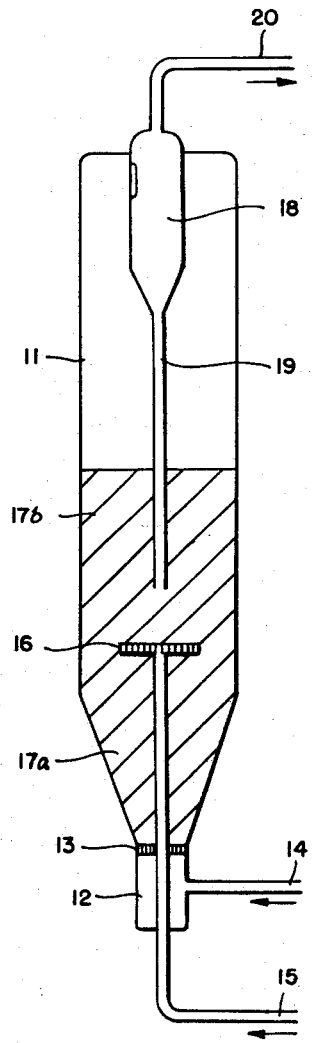

An arrangement in which the layer serving for cracking and the layer serving for regeneration are arranged one above the other is shown diagrammatically in FIGURE 3 of the accompanying drawings. In a reaction vessel 1 tapered conically at the bottom, there is arranged, above a wind chamber 12, a perforated base plate 13 through which is supplied oxygen-containing gas which is supplied from a pipe 14, which passes into a layer 17a of catalyst particles situated above the base plate 13 and sets the particles in fluidized motion. The hydrocarbon to be cracked is supplied through a pipe 15 and through a distributor plate 16 to the catalyst layer 17b situated above the same. The catalyst layers 17a and 17b communicate directly with each other only through the annular space between the distributor plate 16 and the inner wall of the reaction vessel 11. The distance between the distributor plate 1 and the base plate 13 can be regulated so that the oxygen supplied through the base plate 13 is used up by burning off the carbon situated on the catalyst before it reaches the upper distributor plate 16. The fraction of the catalyst particles entrained from the layer 17b by the reaction gases is precipitated in a dust separator 18 and returned through a pipe 19 to the layer. The reaction gas leaves the apparatus through a pipe 20.

The simplicity of the arrangement makes it possible to carry out the process according to this invention at atmospheric, increased or reduced pressure.

The following examples will further illustrate this invention but the invention is not restricted to these examples. The percentages specified are percentages by weight.

tion heat necessary for the dehydrogenation of the butylene is provided by combustion of a part of the initial product and the carbon formed during the reaction.

The reaction is interrupted from time to time in order to determine the amount of carbon deposited on the catalyst. The compositions in percent by volume of the reaction product obtained after various periods of time are given in Table I.

TABLE I

[Composition of the reaction product in percent by volume]

| After hours | $H_2$ | Methane | Ethane ethylene | CO | $CO_2$ | Butane | Butylene | Butadiene | Propane propylene |
|---|---|---|---|---|---|---|---|---|---|
| 12 | 23.2 | 3.09 | 2.12 | 4.9 | 6.39 | 0.85 | 40.25 | 15.97 | 2.34 |
| 50 | 21.1 | 2.7 | | 4.6 | 5.6 | | 38.2 | 15.5 | 1.8 |
| 100 | 22.8 | 3.4 | 1.70 | 3.01 | 6.16 | 0.78 | 42.1 | 15.7 | 3.80 |
| 120 | 23.8 | 3.5 | 1.3 | 3.9 | 4.18 | 0.86 | 42.5 | 17.0 | 2.8 |
| 443 | 29.0 | [1] 5.6 | | 4.8 | 6.2 | 0.92 | 36.0 | 14.6 | |

[1] This value includes the content of methane, ethane, ethylene, propane and propylene.

From this table, by converting the percent by volume to percent by weight and deducting the oxygen of the oxides of carbon, the values given in Table II are obtained.

TABLE II

| After hours | $H_2$ | Methane | Ethane ethylene | Calculated as C | | Butane | Butylene | Butadiene degree of conversion | Propane propylene | Yield of butadiene |
|---|---|---|---|---|---|---|---|---|---|---|
| | | | | CO | $CO_2$ | | | | | |
| 12 | 1.23 | 1.3 | 1.6 | 1.7 | 2.45 | 1.35 | 63.5 | 24.0 | 2.65 | 81 |
| 50 | 1.30 | 1.45 | 1.5 | 1.45 | 2.50 | 1.0 | 64.3 | 23.5 | 2.70 | 81.4 |
| 100 | 1.17 | 1.40 | 1.2 | 0.96 | 1.95 | 1.2 | 64.2 | 22.7 | 4.17 | 76.0 |
| 120 | 1.20 | 1.46 | 0.7 | 1.61 | 1.33 | 1.32 | 64.6 | 24.5 | 3.07 | 86.0 |
| 443 | 1.68 | | | 1.65 | 2.17 | 1.7 | 63.2 | 24.9 | | 86.0 |

*Example 1*

(a) The reactor consists of a vertical tube having a diameter of 60 mm. and a height of 300 mm. and closed at the bottom by a sieve plate. Through the sieve plate there projects into the interior of the tube another tube having a diameter of 40 mm. and a height of 130 mm., so that the two tubes enclose between them an annular space of 8 mm. in width. The two tubes are provided beneath the sieve plate with separate gas supplies. The reactor is heat-insulated and is provided with electric heating by which the heat necessary for the initiation of the reaction can be supplied. Measurement of temperature takes place by thermo-elements.

The reactor is filled to a layer height of 140 to 150 mm. with pulverulent catalyst (aluminum oxide with 12% of chromium oxide) of a grain size of 0.1 to 0.3 mm. so that the upper edge of the inner tube is covered to the extent of about 10 mm. by the layer. While simultaneously heating by means of the electric heating means, the catalyst is set in fluidized motion by a current of nitrogen until the temperature necessary for the reaction has been set up in the reactor. Then, instead of nitrogen, there is led through the annular space oxygen in an amount of 5 liters per hour, and at the same time, through the inner tube, 30 liters per hour of butylene with a content of 0.5% of butane and 5.8% of $C_2$ and $C_3$ hydrocarbons while maintaining a pressure of 50 to 60 mm. in the reactor. The gas speeds of the butylene and oxygen, with the above-mentioned dimensions of cross-section of fluidized layers, are in the ratio 6.3:1.

The reaction gas withdrawn through a vacuum pump is partly liquefied by strong cooling or compression. The amount of uncondensed gas is ascertained by means of a measuring apparatus.

As soon as a temperature of 615° to 620° C. has been reached, the electric heating is shut off because the reaction heat necessary for the dehydrogenation of the butylene is provided by combustion of a part of the initial product and the carbon formed during the reaction.

The butadiene yield is calculated from the content of butadiene and cracked or burnt $C_4$ hydrocarbons. The two latter values result as the difference between the contents of $C_4$ hydrocarbons of the reaction product before and after the dehydrogenation, for example in the said 50-hour experiment, as follows:

$C_4$ hydrocarbons prior to the dehydrogenation _____ 94.2
Total $C_4$ hydrocarbons after the dehydrogenation __ 88.8

Difference _____ 5.4

The butadiene yield in this experiment accordingly amounts to $$\frac{23.5}{23.5+5.4}=81.4\%$$

9% of the butylene is continually reacted to carbon during the dehydrogenation, and this carbon is burnt.

The same results are obtained when the experiments are carried out in the arrangement of apparatus illustrated in FIGURE 3.

(b) If the same experiments as are described in Example 1(a) are carried out in the same reactor but without the inner insertion, by introducing the oxygen through the perforated base and the butylene through a gas inlet pipe opening into the fluidized layer, then with the same throughput as in Example 1(a) the catalyst after two hours is laden with 6.4% and after 20 hours with 36.8% of carbon as a result of which the activity falls considerably. The yield of butadiene after 2 hours is only 40% with reference to reacted butylene and after 20 hours has fallen to 29% with simultaneous worsening of the degree of conversion from 17% to 10%.

*Example 2*

(a) A butane mixture which consists of 67% of butane with a content of $C_2$ hydrocarbons of 1% and 31% of butenes with a content of $C_3$ hydrocarbons of 1%, is dehydrogenated at 615° C. in the experimental apparatus described in Example 1(a) under a pressure of 100 mm. Hg in a fluidized catalyst consisting of $Al_2O_3$ with 12% of $Cr_2O_3$, of which the amount corresponds to 350 ccs.

The hourly throughput amounts to 30 liters of the butane-butene mixture and 5 liters of oxygen.

The compositions of the reaction products obtained in percent by weight with the deduction of the oxygen of the carbon oxides may be seen from Table III:

TABLE III

[Composition of the reaction product in percent by weight]

| After hours | $H_2$ | $CH_4$ | Ethane ethylene | Calculated as C | | Butane | Butylenes | Butadiene degree of conversion | Propane propylene | Yield of butadiene |
| --- | --- | --- | --- | --- | --- | --- | --- | --- | --- | --- |
| | | | | CO | $CO_2$ | | | | | |
| 2 | 1.21 | 1.57 | 4.1 | 1.6 | 2.1 | 48.6 | 26.7 | 11.6 | 2.89 | 50.1 |
| 6 | 1.63 | 2.08 | 3.8 | 1.6 | 1.6 | 41.9 | 28.9 | 15.2 | 3.17 | 55.8 |
| 8 | 1.70 | 2.10 | 1.8 | 2.44 | 1.48 | 41.0 | 28.9 | 15.4 | 3.07 | 55.0 |

(b) If the experiment is carried out under otherwise identical conditions but without subdividing the reactor by an inserted tube, the catalyst is covered with 6.9% of carbon after 2 hours and with 10.2% after 4 hours. The degree of conversion to butadiene is only 6.4 to 8.0%, and the yield 22.7 to 24.5% with reference to reacted $C_4$ hydrocarbons.

*Example 3*

(a) In the apparatus described in Example 1(a), cyclohexane vapor is led at 610° C. under a pressure of 100 mm. Hg through a fluidized layer of aluminum oxide with 12% of chromium oxide. A dehydrogenation product is obtained which consists of 60% of benzene, 1 to 2% of cyclohexene and 37% of unchanged cyclohexane.

(b) By carrying out the dehydrogenation under otherwise identical conditions but without subdividing the reactor, the catalyst is covered with carbon after a short time. The yield in this case is about 10% less.

U.S. patent specification No. 2,445,327 describes a fluidized layer process for the simultaneous pyrolitic distillation and exothermic gasification of carbonaceous solids, such as coal, lignite, oil shale, wood and the like in a reactor in the lower part of which two reaction zones are so arranged adjacent to each other that they communicate at their upper and lower parts, so that one zone serves for the pyrolitic distillation of freshly supplied material and in the other zone the material thus pretreated is subjected to a gasification. A part of the hot carbonaceous residue thereby formed flows back in circulation into the first-mentioned zone and serves therein as heat carrier for the pyrolitic distillation. Having regard to the fact that the reaction mechanism of the said process is of quite a different kind from the cracking of hydrocarbons which is substantially more sensitive to temperature, the possibility of carrying out the process according to the present invention in a technically satisfactory manner could not have been deduced from the said patent specification. Contrasted with the apparatus described in the said patent specification, the arrangement according to the present invention is characterized by simplicity because the fluidized catalyst is conveyed from one layer to the other by natural circulation and without the assistance of additional regulating devices.

*Example 4*

In the apparatus described in Example 1(a) a mixture of 98% pure ethane and 95% pure propane was dehydrogenated under a pressure of 50 to 60 mm. Hg in fluidized layer of a catalyst of the grain size 0.1 to 0. mm. consisting of $Al_2O_3$ with 12% $Cr_2O_3$, the amount of the catalyst corresponding to 350 cm³. The temperature and amounts are specified in Tables IV and V.

TABLE IV

[Ethane/ethylene]

| After hours | Throughput (l./h.) | | ° C. | $CO_2$ calculated as C (percent) | CO calculated as C (percent) | $H_2$ (percent) | $CH_4$ (percent) | $C_2H_6$ (percent) | $C_2H_4$ (percent) | $C_3H_6$ (percent) | Yield of ethylene propylene (percent) |
| --- | --- | --- | --- | --- | --- | --- | --- | --- | --- | --- | --- |
| | $C_2$ | $O_2$ | | | | | | | | | |
| 3 | 50 | 8 | 635 | 5.25 | 0.584 | 0.87 | 0.89 | 81.5 | 10.45 | 0.52 | 66 |
| 5 | 50 | 8 | 635 | 4.4 | 0.52 | 0.74 | 0.76 | 83.8 | 9.1 | 0.60 | 67 |
| 13 | 50 | 5 | 750 | 2.59 | 2.4 | 3.14 | 2.65 | 51.2 | 35.8 | 2.80 | 81 |
| 17 | 50 | 5 | 750 | 3.06 | 2.32 | 2.71 | 2.55 | 51.4 | 34.0 | 4.07 | 77 |

TABLE V

[Propane/propylene]

| After hours | Throughput (l./h.) | | ° C. | $CO_2$ calculated as C (percent) | CO calculated as C (percent) | $H_2$ (percent) | $CH_4$ (percent) | $C_2H_6$ (percent) | $C_2H_4$ (percent) | $C_3H_8$ (percent) | $C_3H_6$ (percent) | $C_4H_{10}$ (percent) | Yield of $C_3H_6/C_2H$ |
| --- | --- | --- | --- | --- | --- | --- | --- | --- | --- | --- | --- | --- | --- |
| | $C_2$ | $O_2$ | | | | | | | | | | | |
| 2 | 30 | 5 | 650 | 3.5 | 0.5 | 1.09 | 2.61 | 5.94 | 2.4 | 67.2 | 15.8 | 0.96 | |
| 7 | 30 | 5 | 700 | 3.8 | 1.8 | 1.66 | 6.31 | 5.78 | 7.8 | 45.8 | 26.5 | 0.61 | |
| 12 | 30 | 5 | 700 | 3.9 | 1.37 | 1.57 | 5.14 | 5.26 | 6.8 | 51.4 | 23.7 | 0.67 | |

In the two experiments, no carbon deposits are observed on the catalyst after 17 and 12 hours, respectively.

The yields exclude the amounts of oxygen in the oxides of carbon as in Tables II and III.

*Example 5*

In the same way as described in Experiments 1 to the vapors of a light naphtha fraction of the boiling range 40 to 80° C. are dehydrogenated under a pressure 50 to 60 mm. Hg with an aluminum silicate catalyst.

TABLE VI

| After hours | Naphtha fraction (g.) | $O_2$ (l./h.) | °C. | Amount of gas (l./h.) | $CO_2$ Calculated as C (Percent) | CO Calculated as C (Percent) | $H_2$ (Percent) | $CH_4$ (Percent) | $C_2H_6$ (Percent) | $C_2H_4$ (Percent) | $C_3H_8$ (Percent) | $C_3H_6$ (Percent) | $C_4H_{10}$ (Percent) | $C_4H_8$ (Percent) | $C_4H_6$ (Percent) | $C_5H_{12}$ (Percent) | $C_5H_{10}$ (Percent) |
|---|---|---|---|---|---|---|---|---|---|---|---|---|---|---|---|---|---|
| 2 | 75 | 6 | 780 | 53 | [1] 3.62 | [1] 6.6 | 0.6 | 9.9 | 2.6 | 24.2 | 0.64 | 11.72 | 3.06 | 15.6 | 2.9 | 17.4 | 4.08 |
| 4 | 75 | 6 | 780 | 71 | [2] 5.0 | [2] 3.82 | 0.9 | 9.6 | 1.9 | 24.8 | 0.6 | 10.45 | 2.73 | 14.3 | 2.8 | 18.5 | 4.07 |

[1] Residue 53.2% equals 40 g.
[2] Residue 47.5% equals 35.5 g.

No carbon deposits on the catalyst can be observed after 4 hours. The residue consists of unreacted naphtha. Formation of aromatic compounds does not occur.

Example 6

In an apparatus according to FIGURE 3, a mixture of methyl butenes is dehydrogenated in the manner described in FIGURE 3 under a pressure of 50 to 60 mm. Hg in a fluidized layer of a catalyst consisting of $Al_2O_3$ with a content of 15% of $Cr_2O_3$ and 5% of $K_2O$.

TABLE VII

| After hours | Methyl butene | $O_2$ (l./h.) | °C. | $H_2$ (percent) | $CH_4$ (percent) | $C_2H_4$ +$C_2H_6$ (percent) | $CO_2$ (percent) | CO (percent) | Isoprene (percent) | Yield (percent) |
|---|---|---|---|---|---|---|---|---|---|---|
| 3 | 87 | 7 | 610 | 1.38 | 2.72 | 3.29 | 1.97 | 3.87 | 33.5 | 72.0 |
| 12 | 86 | 7 | 610 | 0.90 | 1.6 | 3.07 | 2.14 | 3.59 | 31.8 | 74.0 |
| 24 | 83 | 7 | 610 | 0.55 | 1.1 | 2.06 | 3.06 | 2.01 | 24.2 | 73.5 |
| 36 | 87 | 7 | 610 | 0.32 | 1.2 | 2.05 | 3.3 | 1.75 | 27.3 | 76.0 |
| 48 | 93 | 6.5 | 615 | 0.28 | 1.2 | 2.2 | 2.3 | 1.8 | 27.3 | 78.0 |
| 60 | 90 | 6.5 | 620 | 0.28 | 2.72 | 2.06 | 2.3 | 1.7 | 25.6 | 74.0 |
| 72 | 92 | 6.5 | 615 | 0.3 | 1.0 | 1.8 | 2.0 | 1.6 | 25.8 | 79.0 |

Example 7

In an apparatus according to FIGURE 3, a mixture of 20% of methyl butene and 80% of isopentane is dehydrogenated in the manner described in Examples 1(a)–6 under a pressure of 50–60 mm. Hg in a fluidized layer of a catalyst consisting of $Al_2O_3$ with a content of 15% of $Cr_2O_3$ and 4% $K_2O$.

TABLE VIII

| After hours | Throughput hydrocarbons, g./h. | $O_2$ (l./h.) | Temp. (°C.) | $H_2$ (percent) | $CH_4$ (percent) | $C_2H_4$ $C_2H_6$ | $CO_2$ calc. as C (percent) | CO calc. as C (percent) | Isopr. conc. in liquid phase at −80° C. (percent) | Isopr. conc. in the reaction mixt. (percent) | Methyl butenes (percent) | Yield (percent) |
|---|---|---|---|---|---|---|---|---|---|---|---|---|
| 3 | 83.3 | 6 | 630 | 1.47 | 4.33 | 5.38 | 2.67 | 3.1 | 16.1 | 13.4 | 14.2 | 44.4 |
| 6 | 83.3 | 6 | 630 | 1.31 | 4.86 | 6.2 | 2.37 | 2.78 | 16.0 | 13.14 | 11.5 | 43.0 |
| 9 | 83.3 | 6 | 630 | 1.16 | 3.96 | 5.1 | 2.02 | 2.18 | 14.0 | 12.0 | 14.5 | 45.5 |

No carbon deposits can be observed on the catalyst.

Example 8

In the manner described in Example 2 94% isobutane is dehydrogenated under a pressure of 50 to 60 mm. Hg in a fluidized layer of a catalyst consisting of $Al_2O_3$ with a content of 15% of $Cr_2O_3$ and 5% of $K_2O$.

tion and regeneration zones according to the present invention are separate reaction chambers:

Each of the fluidization apparatus according to Experiments 1 to 6 contains two base plates of similar area, so that at a volumetric ratio of hydrocarbon: oxygen of 6:1 the proportion of the gas velocities is 6:1. If as shown in FIGURE 3 the oxygen is supplied from the bottom its residence period in the zone defined by the plates 13 and 16 (FIG. 3) is 6 times larger than that in the 17b zone.

In order to ascertain how far in the bottom fluidized layer the oxygen penetrates unconsumed, the suction tube of a paramagnetic oxygen measuring instrument is fixed at different heights in the fluidized layer of a catalyst laden with carbon. Since the measuring instrument does not work at reduced pressure, 14 parts by volume of nitrogen is admixed so that the partial pressure of the oxygen can be kept constant and a gas velocity according to 50 to 60 mm. Hg be set up.

Figure 4A:
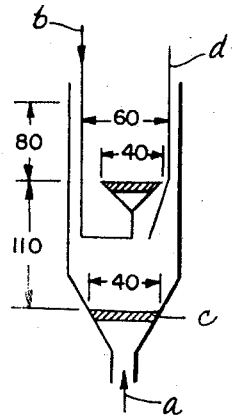

An arrangement of the type used in the experiment is shown diagrammatically in FIGURE 4a of the accompanying drawings. The measurements are given in mm. Through (a) a mixture of oxygen and nitrogen in an amount corresponding to a throughput of 4.5 l. $O_2$ and

TABLE IX

| After hours | Throughput of— Hydrocarbons (g./h.) | $O_2$ (l./h.) | °C. | $H_2$ (Percent) | $CO_2$ calc. as C (Percent) | CO calc. as C (Percent) | $CH_4$ (Percent) | Ethane ethylene (Percent) | Propane propylene (Percent) | n-Butane butylene (Percent) | Iso-butane, percent | Iso-butylene, percent | Yield, percent |
|---|---|---|---|---|---|---|---|---|---|---|---|---|---|
| 6 | 30 | 4 | 650 | 0.98 | 0.96 | 1.71 | 4.03 | 0.95 | 9.42 | 4.04 | 58.2 | 20.0 | 58 |

No carbon deposits can be observed on the catalyst.

Example 9

The following experiment shows that the dehydrogena- 85 l. $N_2$ per hour, and through (b) there is introduced a mixture of 15 l. of butene and 175 l. of nitrogen per hour. For measuring the oxygen content of the gas introduced through (a) samples of the gas are taken with the aid of the oxygen measuring instrument (d) at a distance of 10, 20, 30, 40 and 50 cm. from the bottom plate (c).

Figure 4B:
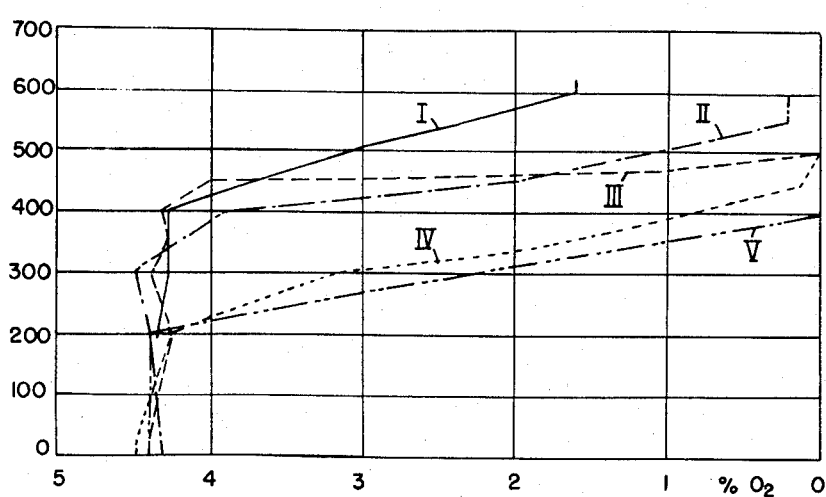

The results of the experiment are illustrated in FIGURE 4b. The curves I, II, III, IV and V correspond to the measurements at 10, 20, 30, 40 and 50 cm. from the bottom plate. It can be seen that the oxygen is completely used up by the reaction with the carbon deposits at a height of between 30 and 40 mm. and a reaction temperature of between 450 and 500° C., so that no oxygen can react with the gaseous hydrocarbons.

We claim:

1. In a process for the catalytic cracking of hydrocarbons in a first zone fluidized layer of a catalyst with simultaneous regeneration of said catalyst in a second zone fluidized layer to remove carbon deposits which have accumulated on the catalyst during cracking, the catalyst being in flowing communication and continuous exchange between said first and second zones, the improvement which comprises: regenerating said catalyst in a vertical columnar regeneration zone of a sufficient height together with the speed of a fluidizing oxygen-containing gas introduced at the bottom of said regeneration zone such that the oxygen is practically completely consumed at the top of said regeneration zone, and introducing hydrocarbon vapors for cracking upwardly in a separate vertical columnar cracking zone located at least partly above said regeneration zone such that the fluidized catalyst is in flowing communication and continuous exchange between said two zones only at the top of said regeneration zone, said two zones forming together a single dense phase fluidized layer of catalyst with a single top surface, the top of said regeneration zone being at a sufficient distance below said top surface of the fluidized layer for exchange of catalyst particles between said two zones.

2. An improved process as claimed in claim 1 wherein the regeneration zone is arranged substantially concentrically within the cracking zone and is separated from said cracking zone by a vertical wall and wherein the communication between the two zones takes place only at the upper end of said zones above said vertical wall.

3. An improved process as claimed in claim 1 wherein there are a plurality of regeneration zones arranged in alternating concentric annular relationship with at least one cracking zone by a plurality of vertical walls and wherein communication between cracking and regeneration zones takes place only at the upper end of said zones above said vertical walls.

4. An improved process as claimed in claim 1 wherein the cracking zone is arranged entirely above the regeneration zone, the oxygen-containing gas being supplied at the bottom of the regeneration zone and the hydrocarbon vapors being supplied to the cracking zone at a point corresponding to the bottom of said cracking zone and located adjacent to and above said regeneration zone.

5. A process as claimed in claim 1 wherein the hydrocarbons to be cracked are n-butenes.

6. A process as claimed in claim 1 wherein the hydrocarbon to be cracked is butane.

7. A process as claimed in claim 1 wherein the hydrocarbon to be cracked is a mixture of butenes and butane.

8. A process as claimed in claim 1 wherein the hydrocarbons to be cracked are methyl butenes.

9. A process as claimed in claim 1 wherein the hydrocarbon to be cracked is a mixture of methyl butane and methyl butenes.

10. A process as claimed in claim 1 wherein the hydrocarbon to be cracked is cyclohexane.

11. A process as claimed in claim 1 wherein the hydrocarbon to be cracked is light naphtha.

12. A process as claimed in claim 1 wherein the hydrocarbon to be cracked is isobutane.

13. A process as claimed in claim 1 wherein the hydrocarbon to be cracked is ethane.

14. A process as claimed in claim 1 wherein the hydrocarbon to be cracked is propane.

15. A process as claimed in claim 1 wherein the hydrocarbons to be cracked are ethane and propane.

16. A process as claimed in claim 1 wherein the catalyst is chromium oxide applied to alumina.

17. A process as claimed in claim 1 wherein the catalyst is aluminum silicate.

18. In a process for the catalytic cracking of hydrocarbons in a first zone of a fluidized layer of a catalyst with simultaneous regeneration of said catalyst in a second zone of said fluidized layer to remove carbon deposits which have accumulated on the catalyst during cracking the catalyst being in flowing communication and continuous exchange between said first and second zones the improvement which comprises introducing hydrocarbon vapors for cracking at the lower end of said cracking zone at a velocity sufficient to maintain said catalyst in fluidized suspension, separately introducing oxygen containing gases at the lower end of said regeneration zone at a velocity sufficient to maintain said catalyst in fluidized suspension and at such a rate that the oxygen is practically completely consumed at the top of said regeneration zone, said fluidized catalyst being in flowing communication and continuous exchange between said regeneration and cracking zones only at the top of said regeneration zone.

19. Apparatus for the catalytic cracking of hydrocarbons and simultaneous regeneration of the catalyst to remove carbon deposits which have accumulated on the catalyst during cracking, said cracking and said regeneration being carried out in a single vertical reaction chamber, which apparatus comprises: an enclosed vertical reaction chamber; a perforated base plate across the bottom of said chamber; vertical divider means including a least one vertically elongated tubular wall extending upwardly from said base plate within said chamber to separate said chamber into at least one regeneration zone and at least one cracking zone, said reaction chamber being of sufficient height to provide a common gas space above said divider means for exchange of catalyst between said cracking and said regeneration zones; means to completely block the flow and exchange of catalyst between said zones at and below said base plate; at least one inlet means to supply a hydrocarbon into the cracking zone of said reaction chamber; at least one inlet means to supply an oxygen-containing gas into the bottom of the regeneration zone of said reaction chamber; and at least one outlet means to remove gas passing upwardly from said cracking and regeneration zones.

20. Apparatus for the catalytic cracking of hydrocarbons and simultaneous regeneration of the catalyst to remove carbon deposits which have accumulated on the catalyst during cracking, said cracking and said regeneration being carried out in a single vertical reaction chamber, which apparatus comprises: a tubular reaction chamber having substantially vertical side walls, a top and a bottom enclosing a single open reaction space; perforated base plate across the lower end of the reaction chamber; means to introduce a fluidizing and oxygen containing gas at the bottom of said reaction chamber and through said base plate over substantially the entire cross section of said reaction space; a hydrocarbon distributor plate arranged at a variable distance above said base plate at a point corresponding to the top of a lower regeneration zone in said reaction space where oxygen is practically completely consumed, said distributor plate having smaller cross-section than that of the reaction space; inlet means to supply a hydrocarbon to said distributor plate; and outlet means at the upper end of said reaction chamber for removal of the reaction gas.

References Cited in the file of this patent

UNITED STATES PATENTS

| | | |
|---|---|---|
| 2,249,337 | Visser et al. | July 15, 1941 |
| 2,378,342 | Voorhees et al. | June 12, 1945 |
| 2,422,501 | Roetheli | June 17, 1947 |
| 2,875,150 | Schuman | Feb. 24, 1959 |
| 2,885,343 | Woebcke | May 5, 1959 |
| 2,899,376 | Krebs et al. | Aug. 11, 1959 |